Figure 1:
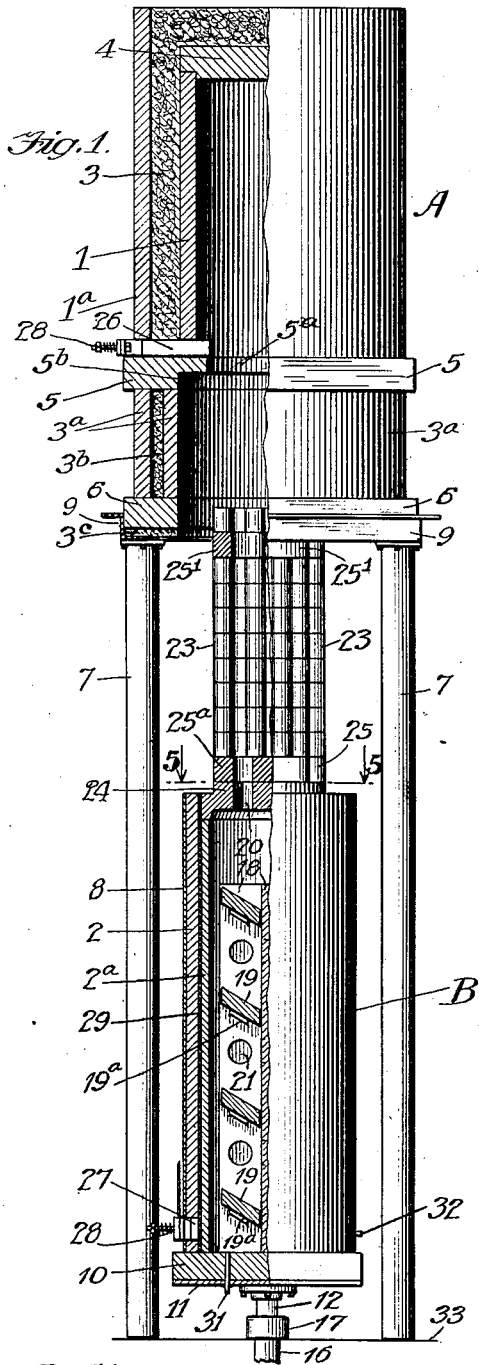

C. H. FULTON.
RECOVERY OF ZINC.
APPLICATION FILED JULY 17, 1916.

1,213,180.

Patented Jan. 23, 1917.
2 SHEETS—SHEET 1.

Witnesses
Martin H. Olsen
Robert Dobberman

Inventor
Charles H. Fulton

C. H. FULTON.
RECOVERY OF ZINC.
APPLICATION FILED JULY 17, 1916.
1,213,180.
Patented Jan. 23, 1917.
2 SHEETS—SHEET 2.
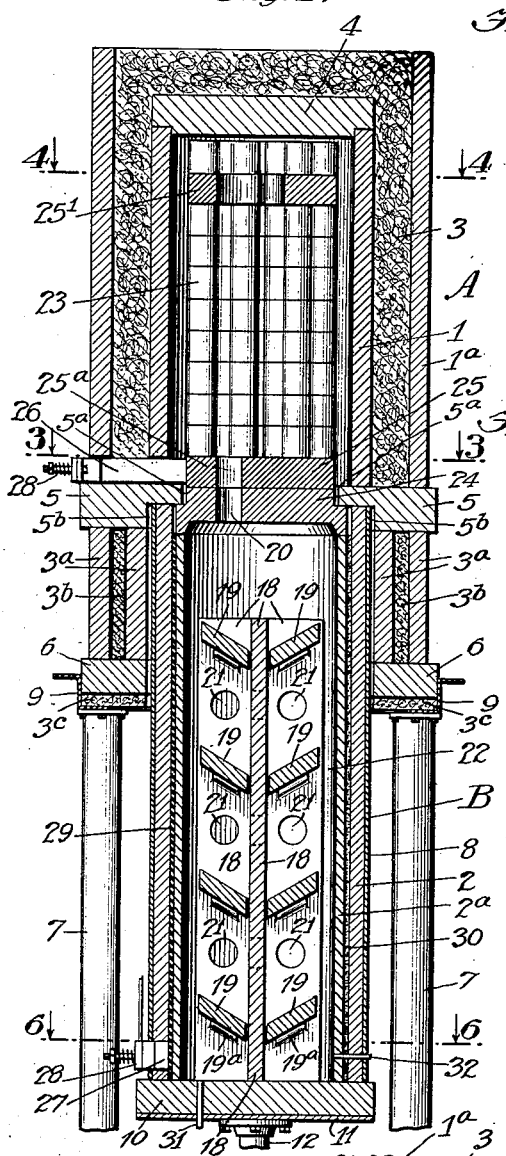

ature can be raised
UNITED STATES PATENT OFFICE.

CHARLES H. FULTON, OF CLEVELAND, OHIO, ASSIGNOR TO DAVID B. JONES, OF CHICAGO, ILLINOIS.

RECOVERY OF ZINC.

1,213,180.   Specification of Letters Patent.   Patented Jan. 23, 1917.

Application filed July 17, 1916. Serial No. 109,724.

*To all whom it may concern:*

Be it known that I, CHARLES H. FULTON, a citizen of the United States, residing at Cleveland, in the county of Cuyahoga and State of Ohio, have invented certain new and useful Improvements in the Recovery of Zinc, of which the following is a description, reference being had to the accompanying drawings, forming part of this specification.

My invention relates to a novel method of electrically distilling zinc ore, for the recovery of spelter or oxid, and consists (1) in the formation of the pulverized ore, reducing agent and a suitable binder into briquets which will maintain their form and volume when subsequently subjected to distillation, (2) preheating said briquets in a reducing atmosphere to drive off the volatile contents of the binder and coke the latter and to convert the briquets into conductors of electricity, (3) interposing the briquets as a continuous fixed resistance between electrodes in a closed retort furnace and passing through them an electric current of such strength as will cause the briquets to be heated to a distilling temperature, and (4) recovering the zinc vapors of distillation in the form of spelter or zinc oxid. It is essential to the practice of my invention that the briquets shall be of such a composition and character that they will not break down or disintegrate in the course of the distilling operation, but will preserve their form and volume, so that they will not shrink away from the electrodes or cause arcs due to bad contacts, but will insure a steady flow of current and consequently a uniform heating and distillation. I have described such briquets, of the character which I preferably employ, in my pending application for Letters Patent No. 68,383, filed December 23, 1915. As there described said briquets are composed of the ground and calcined ore, pulverized coke and hard coal-tar pitch, in proportions varying with different ores, as described in said application, but which may be stated generally as between 50% and 60% (by weight) of ore, between 30% and 40% (by weight) of coke, and between 10% and 20% (by weight) of pitch. The essential thing in respect to the ore and coke is that they shall be of such proportions that there will be left, after distillation, a sufficient mass of porous material to maintain the original volume of the briquet, as explained in my said application, and the essential thing in respect to the amount of pitch or other binder is that it shall be sufficient to completely surround the particles of ore and coke with a film of binder, which will unite them together into a coherent mass by its adhesive action when the briquet is first formed, and which, after the preheating of the briquet and coking of the binder, will permanently and firmly unite the particles of ore and coke by means of the coked residue of the binder left in the briquet. In making up such briquets the hard coal tar pitch, if that be the binder employed, is finely ground and mixed with the pulverized ore and coke until a uniform mixture of the three is obtained. The mixture is then heated to the melting point of the pitch, which melts and softens in place and thoroughly coats each article of ore and coke. The mixture is then formed into briquets of any desired shape, but preferably, for the purposes of my present invention, of cylindrical shape, in suitable molds, in which they are subjected to a high pressure, preferably upward of 500 pounds to the square inch, to solidify the mixture and form it into as firm and compact a mass as possible. The briquets are next preheated or dried, for the purpose of driving off the volatile hydrocarbons of the binder which would tend to dilute the zinc vapors resulting from distillation, and converting the binder into coke. This is preferably done by subjecting the briquets, under reducing or non-oxidizing conditions, to a gradually rising temperature reaching from 400° C. to 600° C. I have found that the pitch which I preferably employ as the binding material becomes thoroughly coked at about 400° C., but the preheating temper considerably above the point without harm, as ordinarily no zinc is distilled below approximately 900° C., and I find it advantageous to heat the briquets to a temperature of from 650° to 700° C. in order to the better convert them into conductors of the electric current. The briquets may be protected from the action of oxygen during the preheating operation by embedding them in finely crushed coke, by which they are completely covered and inclosed, or by preheating them in a heating chamber from which oxygen is excluded.

The structure of the briquets produced in the manner above described is that of a large number of ore particles embedded in a coke matrix, this matrix being made up of the original coke and the coke left by the distillation of the pitch binder, and are of such a character that they will perfectly maintain both their form and volume during the subsequent distilling operation and serve as proper resistor-conductors of the electric current between the electrodes of the electric furnace in which the distilling operation is carried on.

Any suitably constructed furnace, in which the zinc ore briquets may be interposed between the electrodes of the furnace in a closed chamber or retort, and in which the briquets may constitute a continuous resistor between the electrodes of the furnace and be heated to the distilling temperature by the passage of the current through them, may be employed in carrying out my invention. In the accompanying drawings I have illustrated one suitable form of such furnace, representing, with some modifications not affecting its general mode of operation or the described practice of my invention, a furnace which I have successfully used and am now using in the practice of my invention.

Figure 2:
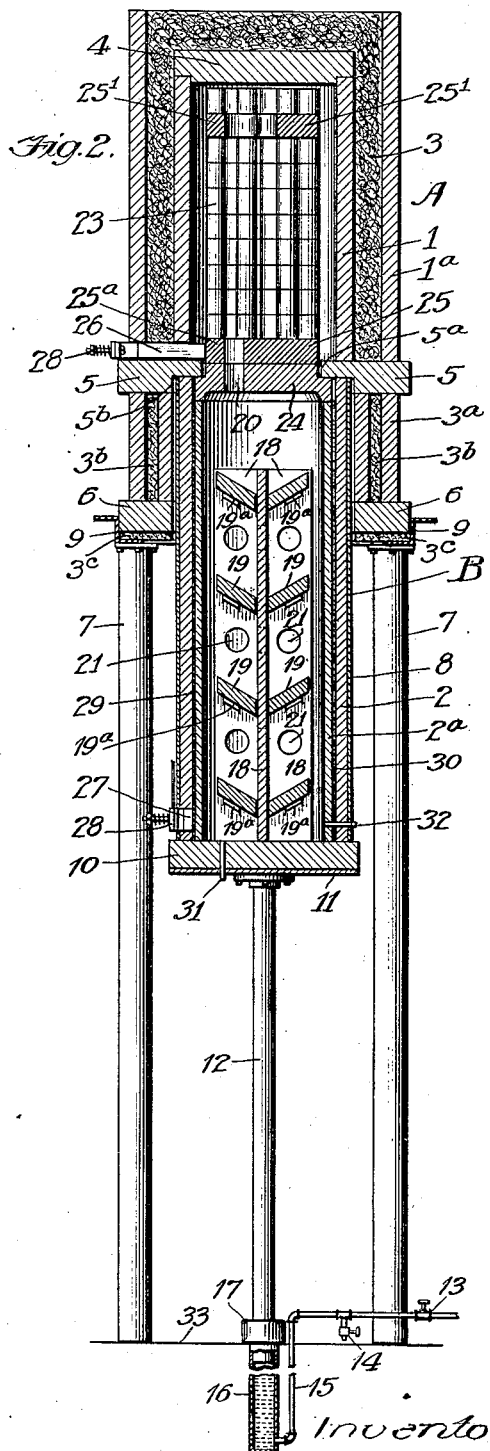

In said drawings Figure 1 is a view, partly in side elevation and partly in section, of the furnace, with the lifting means by which the briquets are lifted into the distillation chamber or retort shown in its lower position, as it would appear either immediately after the distilled briquets have been withdrawn from such chamber or immediately before the undistilled briquets have been raised into it; Fig. 2 is a corresponding view, showing all of the furnace excepting the supporting columns in middle vertical section, and with the supply of briquets lifted into position in the distilling chamber; Fig. 2ª a detail view on an enlarged scale corresponding to Fig. 2; Fig. 3 a sectional plan view on the line 3—3 of Fig. 2, being in a plane between the bottom of the columns of briquets in the heating chamber and the top of the electrodes upon which they rest, the columns of briquets being indicated in dotted lines; Fig. 4 a top plan view of the electrodes resting on the tops of the columns of briquets, the view being taken in the plane indicated by the dotted line 4—4 of Fig. 2ª; Fig. 5 a top plan view of the supporting grid or block, constituting the closure for the upper end of the condenser, upon which the electrodes and columns of briquets are supported; Fig. 6 a sectional plan view in the plane indicated by the dotted line 6—6 of Fig. 2ª; and Fig. 7 a detail view of one of the spring pressure devices of Figs. 3 and 6.

The same letters of reference are used to indicate corresponding parts in the several views.

Mounted upon a platform 5, in this instance consisting of a square fireclay tile (Fig. 3) indirectly supported upon four vertical columns 7, is the distilling chamber or retort A consisting of a cylinder 1 constructed of fire brick, with its open lower end resting upon the platform 5 and having its upper end closed by a removable fireclay tile 4. This chamber is surrounded by an open-ended cylinder 1ª likewise resting at its lower end upon the platform 5, and the annular space 3 between the two is filled with a suitable non-conducting material.

The platform 5 has a central circular opening 5ª to permit the raising and lowering through it of the columns of briquets 23 and the electrodes 25 and 25' at their lower and upper ends, as well as the central cylindrical upper end of the fireclay tile 24 which constitutes the closure for the upper end of the condenser (hereinafter described) and the support for the columns of briquets and the electrodes. The platform 5 is further provided beneath its central opening 5ª above referred to with an annular recess 5ᵇ whose upper wall forms an annular downwardly facing shoulder for contact with the upwardly facing annular shoulder of the tile 24 and the upper end of the cylindrical wall of the condenser B. This condenser consists of a cylindrical chamber resting at its open lower end upon a tile 10 which in turn rests upon a metal supporting plate 11 secured to and carried by the upper end of the piston 12 of a hydraulic lift, composed of said piston 12 and a cylinder 16 to which water under pressure is admitted by a pipe 15. The cylinder 16 extends a sufficient distance below the ground or support 33 upon which the columns 7 rest to accommodate the length of the piston 12. The pipe 15 is provided with an inlet valve 13 and a discharge valve 14, for the admission of water to and its release from the cylinder 16. At the top of the cylinder 16 the piston 12 is surrounded by a rest block 17 seated on the support 33.

In the present instance the cylindrical wall of the condenser B is composed of an outer steel shell 8 immediately inclosing a cylinder 2 constructed of fire brick and separated from a smaller and thinner cylinder 2ª of a similar character inclosed within it by an annular space 30 filled with powdered graphite for electrically heating the condenser. For the latter purpose there are interposed in the annular space 30, at intervals around the same, in the present instance at three equidistant points, as shown in Figs. 5 and 6, carbon strips 29 extending substantially the vertical length of such annular space and in contact at their lower ends with electrodes 27 hereinafter described.

Located centrally in the condenser B, and resting at their lower ends upon the platform 10, are two integrally formed right-angular cross walls 18, forming four radially projecting vertically extending wings with four quadrants or sectors between them. Located in these latter spaces, at intervals in the vertical length of the walls 18, are quadrant-shaped condensing plates 19 composed of fire-brick and resting upon supporting bricks 19ª carried by the walls 18. The outer edges of these plates 19 and of their vertical supporting walls 18 are surrounded by an open annular space 22 extending the full length of the condenser B. The plates 19 have their inner corners so shaped or cut away as to provide vertical open spaces between them and the walls 18 at the inner corners of the latter, to permit free vertical passage of the zinc vapors descending into condenser B from the distilling chamber A above, as hereinafter explained. The walls 18 are further provided with openings 21, to facilitate the free circulation of the zinc vapors within the condenser.

Resting upon the tops of the supporting columns 7 with interposed angular retaining plates 9 and non-conducting material 3ᶜ, is a rectangular platform 6 composed of a fireclay tile and having a central circular opening of the vertical passage of the condenser and parts carried by it; while resting upon the top of this platform 6 are cylindrical supporting walls 3ª separated by an annular space 3ᵇ filled with non-conducting material. The platform 5 which carries the distilling chamber or retort A rests upon the upper ends of these supporting walls 3ª and is thereby indirectly supported upon the platform 6 and columns 7, as before described.

In the present instance I have shown twelve vertical columns of cylindrical briquets 23 as constituting a "charge" for the retort A, and as the furnace shown has been designed for use with a three-phase alternating current connection of the Y-type the columns of briquets are arranged in six pairs, for the purpose of passing the current through them in the manner hereinafter explained. The columns of briquets rest upon the graphite electrodes 25 and 25ª, which in turn rest upon the tile-block or grid 24 which constitutes the closure for the upper end of the condenser B. The three electrodes 25ª (Fig. 3) are each of suitable size and shape to support two columns of briquets and are located at equidistant points around the block 24 adjacent the periphery of its upwardly projecting circular central portion, while the electrode 25 is a three-armed neutral-point electrode, two columns of briquets being supported upon each of its three radial arms, as shown. Current is conveyed to the electrodes 25ª by three graphite electrodes 26 adapted to be inserted from the exterior of the retort chamber through suitable openings therein immediately above the platform 5 and to contact at their inner ends with the electrodes 25ª, said contacts being yieldingly maintained by the spring pressure devices 28 best shown in Figs. 3 and 7 and hereinafter described.

At the tops of the columns of briquets the adjacent pairs of columns are connected in the manner shown in Fig. 4 by the electrodes 25′, each of which is suitably shaped to rest upon and electrically connect the tops of two adjacent pairs of columns. In Figs. 2 and 3 I have shown twelve additional briquets resting in pairs upon the tops of the electrodes 25′, to serve the purposes of weights to maintain better contact between the electrodes 25′ and the tops of the columns of briquets upon which said electrodes rest.

Under the above described construction and arrangement of parts, if we take, for the purposes of explanation, the current conveyed to the left hand pair of columns of briquets in Fig. 3 by the left hand electrode 26 there shown, the current will pass upward through said columns of briquets to the electrode 25′ which rests upon their upper ends, (Fig. 4) thence through said electrode to the upper end of the adjacent pair of columns of briquets, thence downwardly through said columns to the radial arm of the electrode 25 upon which said columns rest, being the upper left-hand arm of said electrode in Fig. 3, thence to the neutral point at the center of said electrode. The passage of the current for the other pairs of columns of briquets is similarly all convergent on the neutral point of the electrode 25, which gives the common Y-connection of the alternating three-phase current.

Briquets of the composition and character above described have a specific resistance of about .03 ohms per cubic inch, and the columns of briquets interposed between the electrodes will have a certain definite resistance, which may be readily calculated by the cross-sections of the briquets, the height and number of the columns, and the manner of connecting them with each other; and any desired quantity of electric current can be passed through them, dependent upon the voltage impressed upon the electrodes 26. By varying the amount of current sent through the briquets, the speed of distillation may be kept under perfect control, and the rate of distillation be varied at will. The current is preferably supplied to the furnace through a transformer so designed as to supply current at different voltages. If the current is too great or too small, at any given voltage, the voltage at the transformer may be decreased or increased until the proper flow of current is obtained. The amount of current passed through the briquets is preferably at first relatively small, so that the walls 1 of the retort A will be heated, rather gradually to about 700° C. or 800° C. by radiation from the briquets. The current may then be rapidly increased and the briquets raised to a distilling temperature. The zinc vapor then freely evolved will fill the retort space and pass down between the electrodes 25 and 25$^a$ and through the openings 20 in the block or grid 24 into the condenser B. The condenser is kept at a temperature between 500° and 650° C., the higher temperature obtaining near the top and the lower near the bottom. The zinc vapor strikes against the condensing plates 19, and circulates between the same and the walls 18, as well as through the openings 21 and in the annular space 22 surrounding the walls 18. The large surfaces afforded by these parts and the interior walls 2 of the condenser serve to rapidly condense the zinc vapor into liquid zinc, which collects in the bottom of the condenser. The carbon mon-oxid gas evolved in the distillation of the briquets passes out and burns at the opening 32 in the bottom of the condenser. The liquid zinc is tapped off at the tap 31. When the briquets are completely distilled, which is known by the dying down of the flame at the opening 32, the condenser is lowered by means of the hydraulic apparatus into the position shown in Fig. 1, and the briquets then quenched rapidly with a spray of water and removed from the grid 24, a fresh charge put in their place, and the condenser again raised into distilling position and the described operation repeated.

The heating of the condenser B, above referred to, may be effected by current supplied to the vertical carbon strips 29, through the electrodes 27, which electrodes may be yieldingly held in place, with their inner ends in contact with the strips 29, by means of spring-devices 28 similar to those employed for holding the electrodes 26 in position, as shown in Fig. 6. Referring to these spring-devices for holding the electrodes in place, one of those shown in Fig. 3 is also shown in enlarged sectional detail in Fig. 7, where it will be seen that the outer surrounding wall 1$^a$ of the retort chamber A has seated in it two outwardly projecting bolts 33 upon which are mounted the spring-devices which operate to press the electrode 26 inward against the electrode 25$^a$, upon which two of the vertical columns of briquets within the retort A are supported. Mounted upon these bolts 33, with suitable interposed bushings 34 of insulating material, is a copper plate 35 to which the conductors 36 conveying the electric current are connected. Fitting against the inner side of the plate 35, with like interposed insulating bushings surrounding the bolts 33, is the flanged base 37 of a water cooler 38, composed in this instance of a rectangular box formed integral with the plate 37, and with its inner side bearing against the outer end of the electrode 26. This water cooler box and its base plate are formed of copper, to constitute a conductor between the plate 35 and the electrode 26. The latter is insulated from the inner wall 1 of the retort A by an insulating bushing 39 and from the outer wall 1$^a$ of said retort by a bushing 40 the outer portion of which is of cup shape and of suitable size to receive and partially inclose the box 38 of the water cooler. Water is circulated through the latter by means of inlet and outlet pipes 41 and 42. Coiled springs surrounding the outer ends of the bolts 33 and confined thereon by nuts 43 and pressing inward against the plate 35 serve to press the latter inward and maintain contact between the part 38 of the water cooler and the electrode 26 and between the latter and the electrode 25.

The connection of the supply conductors with the three electrodes 27 and vertical heater strips 29 for heating the condenser B, as shown in Fig. 6, constitutes the ordinary delta or triangle connection.

I am aware that it has been proposed to distil zinc ore in an electric furnace by employing the ore charge itself as the resistor between the electrodes of the furnace, but I am not aware of any instance in which the ore charge has been made up into briquets of a composition and character which would preserve their form and volume during distillation, which is a very great advantage and I believe essential to the successful distillation of zinc ore in this manner. Where the ore charge in loose form is employed as the resistor, the charge changes its form and electric conductivity during the attempted distillation of it, so that it is impossible to maintain a continuous non-changing resistor between the electrodes and control the operation of the furnace. I am also aware that it has been proposed to distil zinc ore in electric furnaces of the arc type, but it is difficult in such furnaces to realize the conditions of a closed distilling chamber or retort and to maintain a strictly reducing atmosphere and exclude foreign gases, for which reasons, I am informed, such arc furnaces have failed in the satisfactory condensation of the zinc vapor.

By forming the ore charge into briquets of the character I have described, and employing such briquets as a continuous resistor between the electrodes of the furnace, the heat is developed uniformly in the charge of ore itself, with no local overheating as in an arc furnace, and the heat is developed where it is absorbed by the reactions involved, without serious loss by radiation. The furnace may be readily worked as a closed furnace of the retort type, the charge being maintained under strictly reducing conditions, with the exclusion of gases except the carbon mon-oxid generated by the reduction. The closed furnace is very desirable for the subsequent successful condensation of the zinc vapor. I have found it possible to relatively somewhat increase the amount of zinc vapor and decrease the amount of carbon mon-oxid, by heating the briquets to a temperature of about 950° C. and maintaining this temperature for a time, during which some of the zinc oxid is reduced, but the zinc is not vaporized to any appreciable extent, chiefly carbon mon-oxid being liberated and burned at the opening 32. The effect of this is that in the later stages of the distillation the concentration of the zinc vapor may be increased and a better condensation of liquid zinc obtained in the condenser.

While I have described the preheating of the briquets as a separate and distinct step in my novel process or method of recovering zinc, preferably carried on in a heating chamber separate and apart from the distilling furnace, such preheating of the briquets may nevertheless be effected in the retort of the furnace itself. Under the latter practice, when a charge of briquets has been distilled it is lowered out of the retort in the manner described, the distilled briquets are quenched and removed from the seat 24 and the electrodes 25, a new charge of briquets is put in place and lifted up into the retort while the latter is still white hot. The stored heat in the retort will be sufficient to properly preheat the briquets, coking the binder content of them and making them conductors of electricity, after which the current may be turned on and the distilling operation proceded with in the regular way. The volatile matter evolved during the preheating of the briquets in this manner may be permitted to escape at the opening 32, or, if considered undesirable to have it pass through the condenser, a hole may be provided in the cover 4 of the retort, which may be closed with fireclay after the preheating has been completed. Where, therefore, the preheating of the briquets is referred to as a separate and distinct step in my novel method, both in the statement of my invention at the beginning of this specification and in the following claims, it will be understood that such statement and claims contemplate the carrying on of such step either in an independent heating chamber or in the retort of the distilling furnace in the manner last described above.

Having thus fully described my invention, I claim:

1. The herein described method of recovering zinc, which consists in (1) mixing the ground and calcined ore with a reducing agent and a binder of such a character and in such proportions as will cause briquets formed from such mixture to maintain their form and volume during the process of distillation, (2) forming such ore mixture into compact briquets under pressure, (3) preheating such briquets to drive off the volatile contents of the binder and convert the latter into coke, (4) interposing said briquets as a continuous resistor between the electrodes of a closed electric furnace and passing a current of electricity through them to heat them to a distilling temperature, and (5) recovering the zinc from the zinc vapor evolved by the distillation of the briquets.

2. The herein described method of recovering zinc, which consists in (1) mixing the ground and calcined ore with pulverized coke and with a carbonaceous binder such as pitch in such proportions as will cause the briquets formed from such mixture to maintain their form and volume during the process of distillation, (2) forming such ore mixture into compact briquets under pressure, (3) preheating such briquets to drive off the volatile contents of the binder and convert the latter into coke, (4) interposing said briquets as a continuous resistor between the electrodes of a closed electric furnace and passing a current of electricity through them to heat them to a distilling temperature, and (5) recovering the zinc from the zinc vapor evolved by the distillation of the briquets.

CHARLES H. FULTON.

Witnesses:
J. A. OVERTON,
WILSON RITEB, Jr.